United States Patent
Blackmon et al.

(10) Patent No.: US 8,539,309 B2
(45) Date of Patent: Sep. 17, 2013

(54) SYSTEM AND METHOD FOR RESPONDING TO ERROR DETECTION

(75) Inventors: H. Lee Blackmon, Moline, IL (US); Ryan S. Haraden, Rochester, MN (US); Joseph A. Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/561,687

(22) Filed: Sep. 17, 2009

(65) Prior Publication Data

US 2011/0066921 A1 Mar. 17, 2011

(51) Int. Cl.
*G11C 29/38* (2006.01)
*G11C 29/54* (2006.01)

(52) U.S. Cl.
USPC .......................................... 714/763; 714/748

(58) Field of Classification Search
None
See application file for complete search history.

(56) References Cited

U.S. PATENT DOCUMENTS

| | | | |
|---|---|---|---|
| 6,437,937 B1* | 8/2002 | Guo et al. | 360/78.05 |
| 7,392,337 B2* | 6/2008 | Gower et al. | 711/5 |
| 2005/0108465 A1* | 5/2005 | Vogt | 711/100 |
| 2006/0026345 A1 | 2/2006 | Nishimoto et al. | |
| 2008/0002590 A1* | 1/2008 | Thomas et al. | 370/242 |

* cited by examiner

*Primary Examiner* — Ajay Bhatia
*Assistant Examiner* — Dipakkumar Gandhi
(74) *Attorney, Agent, or Firm* — Toler Law Group

(57) ABSTRACT

Systems and methods to respond to error detection are provided. A particular method may include issuing a first command to a first redrive device and a second command to a second redrive device. The method may also include reissuing the second command to the second redrive device in response to detecting a transmission error between a memory controller and the second redrive device. The method may further include storing at a first buffer first data that is received from the first redrive device in response to the first command. The method may include storing at a second buffer second data that is received from the second redrive device in response to the reissued second command. The method also may include merging the second data with the first data.

21 Claims, 8 Drawing Sheets

SYSTEM AND METHOD FOR RESPONDING TO ERROR DETECTION

I. FIELD OF THE INVENTION

The present invention relates generally to data communication, and more specifically, to responding to error detection.

II. BACKGROUND

Successful storage and transmission of data may be impeded by errors in the data. A number of factors may cause data corruption. For example, a soft error may result from an unintentional bit flip caused by an alpha particle or noise. As another example, drift or skew due to temperature or voltage variations over time may create a hard error in the data.

Corrective action is usually initiated in response to a detection of the error. For instance, a memory controller may reissue a command after determining that a command was corrupted during transmission. In some instances, the memory controller may initiate a retrain of a link between the memory controller and a memory structure before reissuing the command to the memory structure via the link.

Corrective actions may limit the capability of the memory structure to perform some operations. For example, while retraining the link, the memory controller may be unable to use the link to transmit read and write commands to the memory structure. Reducing the amount of time that the memory controller performs corrective actions may increase the availability of the memory controller to perform normal operations. The increased availability translates into improved efficiency and reduced memory latency. It is therefore desirable to increase the ratio of time spent by the memory controller on normal operations versus corrective actions.

III. SUMMARY OF THE DISCLOSURE

In a particular embodiment, a method to respond to error detection is disclosed. The method includes issuing a first command to a first redrive device and a second command to a second redrive device. The method also includes reissuing the second command to the second redrive device in response to detecting a transmission error between a memory controller and the second redrive device. The method further includes storing at a first buffer first data that is received from the first redrive device in response to the first command. The method includes storing at a second buffer second data that is received from the second redrive device in response to the reissued second command. The method also includes merging the second data with the first data.

In another embodiment, a method to respond to error detection is disclosed. The method includes transmitting a constant pattern in response to initiation of a retrain of a link between a memory controller and a redrive device. The method also includes interrupting the transmission of the constant pattern after the constant pattern has been transmitted for a minimum duration to transmit a sequence of transitions. The method further includes resuming the transmission of the constant pattern after transmitting the sequence of transitions.

In another embodiment, a method to respond to error detection is disclosed. The method includes creating first scrub commands at a first scrub controller. The method also includes creating second scrub commands at a second scrub controller. The method further includes alternating issuance of the first scrub commands and the second scrub commands at a memory controller port.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

IV. BRIEF DESCRIPTION OF THE DRAWINGS

V. DETAILED DESCRIPTION

Figure 1:
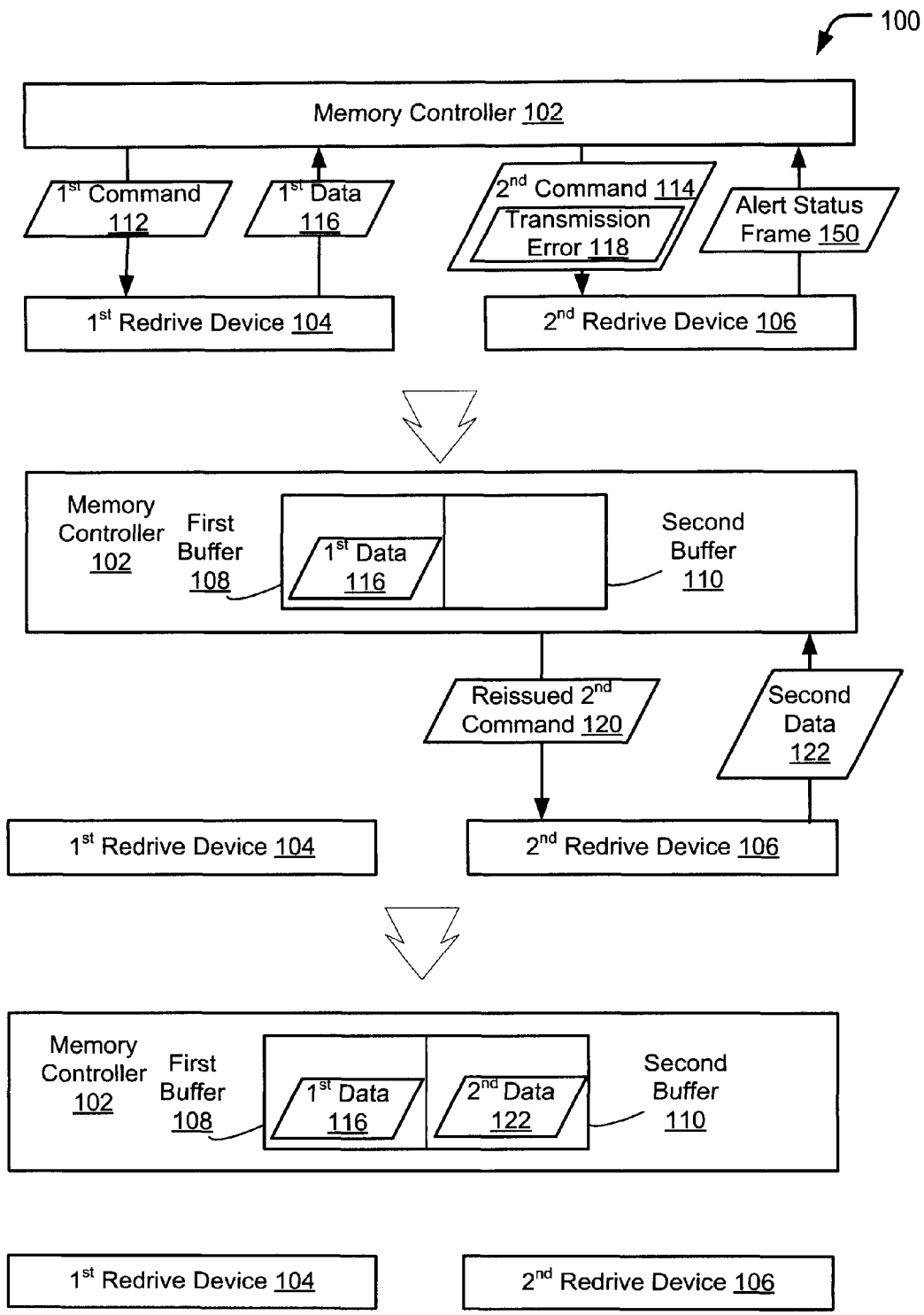
FIG. 1 is a block diagram of a first embodiment of a system to respond to error detection.

FIG. 1 is a diagram of a first embodiment of a system to respond to error detection and is generally designated 100. The system 100 includes a first redrive device 104, a second redrive device 106, and a memory controller 102 with a first buffer 108 and a second buffer 110. The memory controller 102 and the first redrive device 104 may be connected via a first high speed link and the memory controller 102 and the second redrive device 106 are connected via a second high speed link. Each high speed link may refer to two unidirectional high speed links. For example, the memory controller 102 may transmit to the first redrive device 104 via a southbound link of the first high speed link and the first redrive device 104 may transmit to the memory controller 102 via a northbound link of the first high speed link.

Generally, the memory controller 102 may split a single command into two commands (e.g., a first command 112 and a second command 114). The first command 112 may be transmitted to a first redrive device 104, and the second command 114 may be transmitted to a second redrive device 106. To complete the single command, both the first command 112 and the second command 114 may be executed. The memory controller 102 may receive good data (e.g., first data 116) from the first redrive device 104 in response to transmission of the first command 112 and may detect a transmission error 118 between the memory controller 102 and the second redrive device 106 in response to transmission of the second command 114. A response to the single command may not be complete without good data being received in response to both the first command 112 and the second command 114. Instead of discarding the first data 116 and retransmitting both the first command 112 and the second command 116, the memory controller 102 may store the good data (e.g., the first data 116) received in response to the first command 112. The memory controller 102 may reissue the second command 114 (e.g., reissued second command 120) to the second redrive device 106.

After receiving good data (second data 122) in response to the reissued second command 120, the memory controller may merge the first data 116 and the second data 122 to produce a synchronized complete data response to the single command. Reissuing only the second command 114 instead of both commands may prevent some errors. For instance, execution of the first command 112 may alter the data in a memory structure. Reissuance of the first command 112 may initiate the retrieval of the altered data in the memory structure instead of the initial data, as retrieved in the first data 116.

Preservation of the first data 116 to merge with the second data 122 received in response to the reissued second command 120 may reduce the complexity of a corrective action that is performed. Reducing the complexity of the corrective action may reduce the amount of time dedicated to performing the corrective action and increase the amount of time that the memory controller is available to perform normal processes. Increasing the ratio of time spent performing normal processes to time spent performing corrective actions may improve the efficiency of the memory controller 102 and decrease memory latency.

The memory controller 102 may be configured to issue the first command 112 to the first redrive device 104 and the second command 114 to the second redrive device 106. The memory controller 102 may be configured to reissue the second command (e.g., the reissued second command 120) to the second redrive device 106 in response to detecting the transmission error 118 between the memory controller 102 and the second redrive device 106. The memory controller 102 is configured to store at the first buffer 108 the first data 116 that is received from the first redrive device 104 in response to the first command 112. The memory controller 102 may be configured to store at the second buffer 110 the second data 122 that is received from the second redrive device 106 in response to the reissued second command 120. The memory controller 102 is configured to merge the second data 122 with the first data 116.

The memory controller 102 may issue the first command 112 to the first redrive device 104. The first redrive device 104 may decode and reformat the first command 112 to send to a first memory structure (not illustrated) connected to the first redrive device 104. For example, after decoding and reformatting the first command 112, the first redrive device 104 may transmit the first command 112 to the first memory structure.

In response to receiving the first command 112 from the first redrive device 104, the first memory structure may transmit the first data 116 to the first redrive device 104. The first redrive device 104 may reformat the first data 116 and transmit the reformatted first data 116 to the memory controller 102 via the northbound link of the first high speed link. In response to receiving the first data 116, the memory controller 102 may store the first data 116 at the first buffer 108. Storing the first data 116 at the first buffer 108 may allow the memory controller 102 to preserve good data while performing a corrective action in response to detection of the transmission error 118 between the memory controller 102 and the second redrive device 106.

Detecting the transmission error 118 may include the second redrive device 106 detecting the transmission error 118 in the second command 114 received from the memory controller 102. For instance, the second redrive device 106 may include logic that checks commands received from the memory controller 102 for cyclic redundancy checks (CRC) errors. The CRC checking may indicate that the second command 114 received from the memory controller 102 via the second southbound link contains a CRC error (e.g., the transmission error 118).

After detecting the transmission error 118, the second redrive device 106 may drop second subsequent commands in a second command stream received from the memory controller 102 and return an alert status frame 150 to the memory controller 102. Dropping the second subsequent commands in the second command stream may include the second redrive device 106 not redriving the second command 114 or the second subsequent commands to a second memory structure (not illustrated).

The second redrive device 106 may return a stream of alert status frames to the memory controller 102 via a northbound link of the second high speed link in response to detection of the transmission error 118. The memory controller 102 may use the received alert status frames to detect the transmission error 118 between the memory controller 102 and the second redrive device 106. For example, the memory controller 102 may determine that the transmission error 118 occurred in a southbound link of the second high speed link. The determination may be based on the receipt of the alert status frame 150 via the northbound link of the second high speed link.

In response to detecting the transmission error 118, the memory controller 102 may halt issuance of subsequent commands to both the first redrive device 104 and the second redrive device 106 to perform the corrective action on the link between the memory controller 102 and the second redrive device 106. For instance, after receiving the alert status frame 150, the memory controller 102 may issue a link reset of the second high speed link. The link reset may clear the second high speed link of the alert status frames. After the second high speed link is cleared, the second high speed link may be ready for reissuance of the second command stream. The memory controller 102 may reissue the second command (e.g., the reissued second command 120) to the second redrive device 106 via the southbound link of the second high speed link.

The memory controller 102 may reissue the second command stream to the second redrive device 106 to allow the second redrive device 106 to redrive the second command stream to the second memory structure. For example, the memory controller 102 may reissue the second command stream from a point where the second redrive device 106 terminated the second command stream in response to detecting the transmission error 118. The memory controller 102 may reissue the second command stream to the second redrive device 106 starting with the reissued second command 120.

The second redrive device 106 may redrive the reissued second command 120 to the second memory structure. In response to receiving the reissued second command 120, the second memory structure may retrieve the second data 122 and transmit the second data 122 to the second redrive device 106. The second redrive device 106 may transmit the second data 122 to the memory controller 102. The memory controller 102 may store the second data 122 in the second buffer 110 to merge with the first data 116 at the first buffer 108. Rather than reissuing commands to both the redrive devices when the transmission error 118 is detected, storing the first data 116 allows the memory controller 102 to avoid errors that may be created by reissuing the first command 112 to the first redrive device 104. For instance, execution of the first command 112 may have altered original data in a memory structure.

Reissuing the first command 112 may initiate retrieval of the altered data in the memory structure, instead of the original data that was retrieved as the first data 116. Preservation of the first data 116 to merge with the second data 122 received in response to the reissued second command 120 may reduce the complexity of the corrective action that is performed. Reducing the complexity of the corrective action may, in turn, reduce the amount of time dedicated to performing the corrective action and increase the amount of time that the memory controller 102 is available to perform normal processes. Increasing the ratio of time spent performing normal processes to time spent performing corrective actions may improve the efficiency of the memory controller 102 and decrease memory latency.

Figure 2:
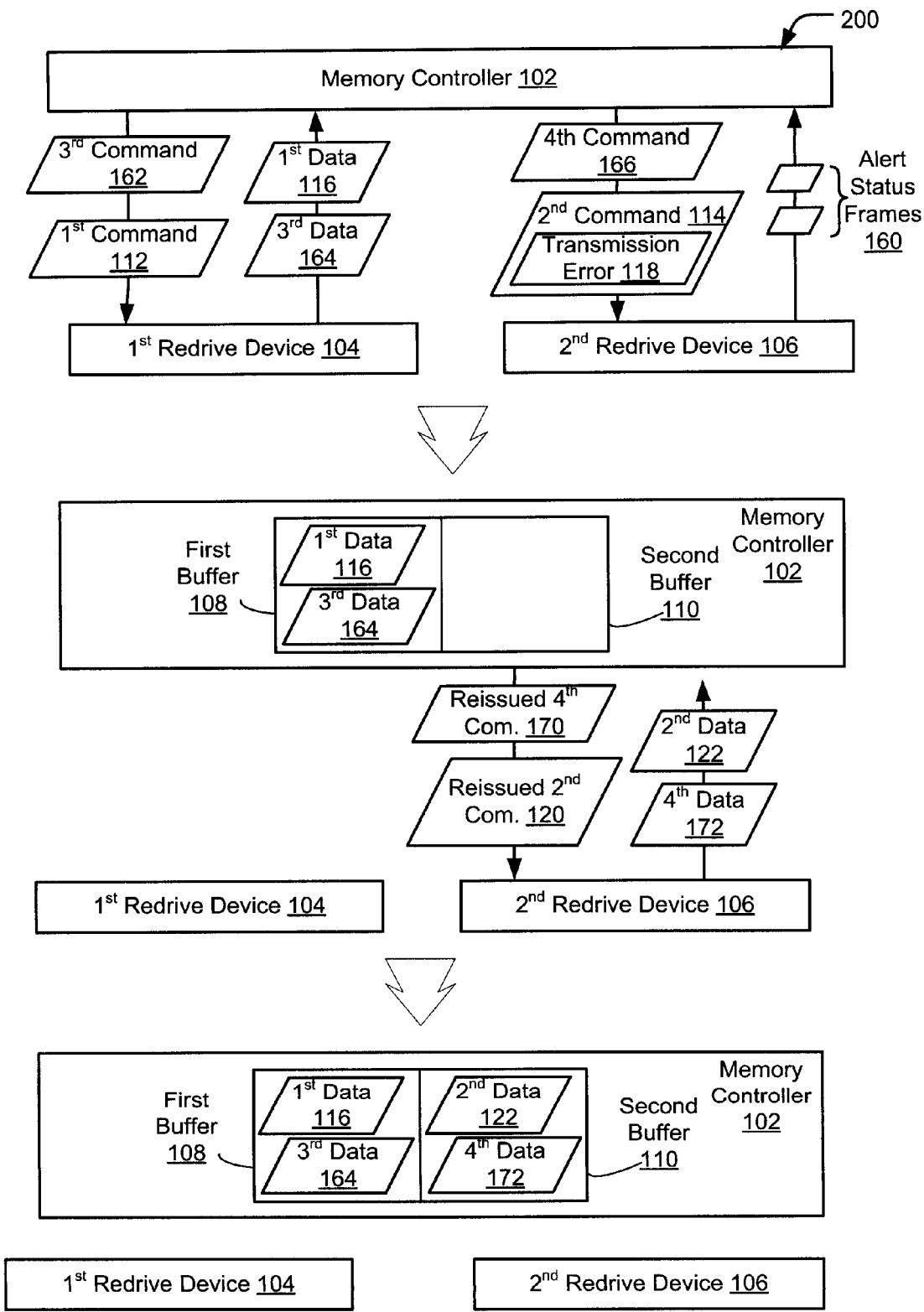
FIG. 2 is a block diagram of a second embodiment of a system to respond to error detection.

Referring to FIG. 2, a diagram of another embodiment of a system to respond to error detection is illustrated and is generally designated 200. The system 200 includes many elements found in the system 100 referred to in FIG. 1, where similar elements have the same reference number.

During operation, the memory controller 102 may issue the first command 112 to the first redrive device 104. The first redrive device 104 may decode and reformat the first command 112 to send to a first memory structure (not illustrated). The first memory structure may be connected to the first redrive device 104. For example, after decoding and reformatting the first command 112, the first redrive device 104 may transmit the first command 112 to the first memory structure.

In response to receiving the first command 112 from the first redrive device 104, the first memory structure may transmit the first data 116 to the first redrive device 104. The first redrive device 104 may reformat the first data 116 and transmit the reformatted first data 116 to the memory controller 102 via the northbound link of the first high speed link. In response to receiving the first data 116, the memory controller 102 may store the first data 116 at the first buffer 108. Storing the first data 116 at the first buffer 108 may allow the memory controller 102 to preserve good data (i.e., the first data 116) while performing a corrective action in response to detection of the transmission error 118 between the memory controller 102 and the second redrive device 106.

Detecting the transmission error 118 may include the second redrive device 106 detecting the transmission error 118 in the second command 114 received from the memory controller 102. For instance, the second redrive device 106 may include logic that checks commands received from the memory controller 102 for CRC errors. The CRC checking may indicate that the second command 114 received from the memory controller 102 via the second southbound link contains a CRC error (e.g., the transmission error 118).

After detecting the transmission error 118, the second redrive device 106 may drop second subsequent commands in a second command stream received from the memory controller 102. The second redrive device 106 may further return an alert status frame to the memory controller 102. Dropping the second subsequent commands in the second command stream may include the second redrive device 106 not redriving the second command 114 or the second subsequent commands to a second memory structure (not illustrated).

The second redrive device 106 may return a stream of alert status frames 160 to the memory controller 102. The frames 160 may be returned via a northbound link of the second high speed link in response to detection of the transmission error 118. The memory controller 102 may use the received alert status frames 160 to detect the transmission error 118 between the memory controller 102 and the second redrive device 106. For example, the memory controller 102 may determine that the transmission error 118 occurred in a southbound link of the second high speed link. The determination may be based on a receipt of the alert status frame via the northbound link of the second high speed link.

In response to detecting the transmission error 118, the memory controller 102 may halt issuance of subsequent commands to both the first redrive device 104 and the second redrive device 106. The corrective action on the second high speed link between the memory controller 102 and the second redrive device 106 may be performed. For example, the memory controller 102 may issue a link reset of the second high speed link after receiving the alert status frames 160. The link reset may clear the second high speed link of the alert status frames 160. The second high speed link may further be ready for reissuance of the second command stream. The memory controller 102 may reissue the second command (e.g., the reissued second command 120) to the second redrive device 106 via the southbound link of the second high speed link.

The memory controller 102 may reissue the second command stream to the second redrive device 106 to allow the second redrive device 106 to redrive the second command stream to the second memory structure. For instance, the memory controller 102 may reissue the second command stream from a point where the second redrive device 106 terminated the second command stream in response to detecting the transmission error 118. The memory controller 102 may reissue the second command stream to the second redrive device 106 starting with the second command (e.g., the reissued second command 120).

In a particular embodiment, the second redrive device 106 may redrive the reissued second command 120 to the second memory structure. In response to receiving the reissued second command 120, the second memory structure may retrieve the second data 122 and transmit the second data 122 to the second redrive device 106. The second redrive device 106 may transmit the second data 122 to the memory controller 102. The memory controller 102 may store the second data 122 in the second buffer 110 to merge with the first data 116 at the first buffer 108.

A second set of commands may be issued from the memory controller 102 to the redrive devices before the transmission error 118 is detected. For example, the memory controller 102 may issue a third command 162 to the first redrive device 104 after issuance of the first command 112. The memory controller 102 may issue a fourth command 166 to the second redrive device 106 after issuance of the second command 114. The memory controller 102 may receive third data 164 in response to the third command 162. The third data 164 may be stored at the first buffer 108. However, after receiving the alert status frames 160 from the second redrive device 106, the memory controller 102 may reissue the fourth command (e.g., reissued fourth command 170) to the second redrive device 106. The memory controller 102 may receive fourth data 172 in response to the reissued fourth command 170. The memory controller 102 may store the fourth data 172 at the second buffer 110 to merge with the third data 164 in the first buffer 108. In a particular embodiment, the first buffer 108 includes several buffers. The first data 116 may be stored in one of the several buffers of the first buffer and the third data 164 may be stored in another one of the several buffers of the first buffer.

Rather than reissuing commands to both the redrive devices when the transmission error 118 is detected, storing the first data 116 and the third data 164 allows the memory controller 102 to avoid errors that may be created by reissuing the first command 112 and the third command 162 to the first redrive device 104. For instance, execution of the first command 112 may have altered original data in a memory structure. Reissuance of the first command 112 may retrieve the altered data in the memory structure instead of the original data as retrieved in the first data 116. Preservation of the first data 116 to merge with second data 122 received in response to the reissued second command 120 may reduce the complexity of the corrective action that is performed. Reducing the complexity of the corrective action may reduce the amount of time dedicated to performing the corrective action and increase the amount of time that the memory controller 102 is available to perform normal processes. Increasing the ratio of time spent performing normal processes to time spent performing corrective actions may improve the efficiency of the memory controller 102 and decrease memory latency.

Figure 3:
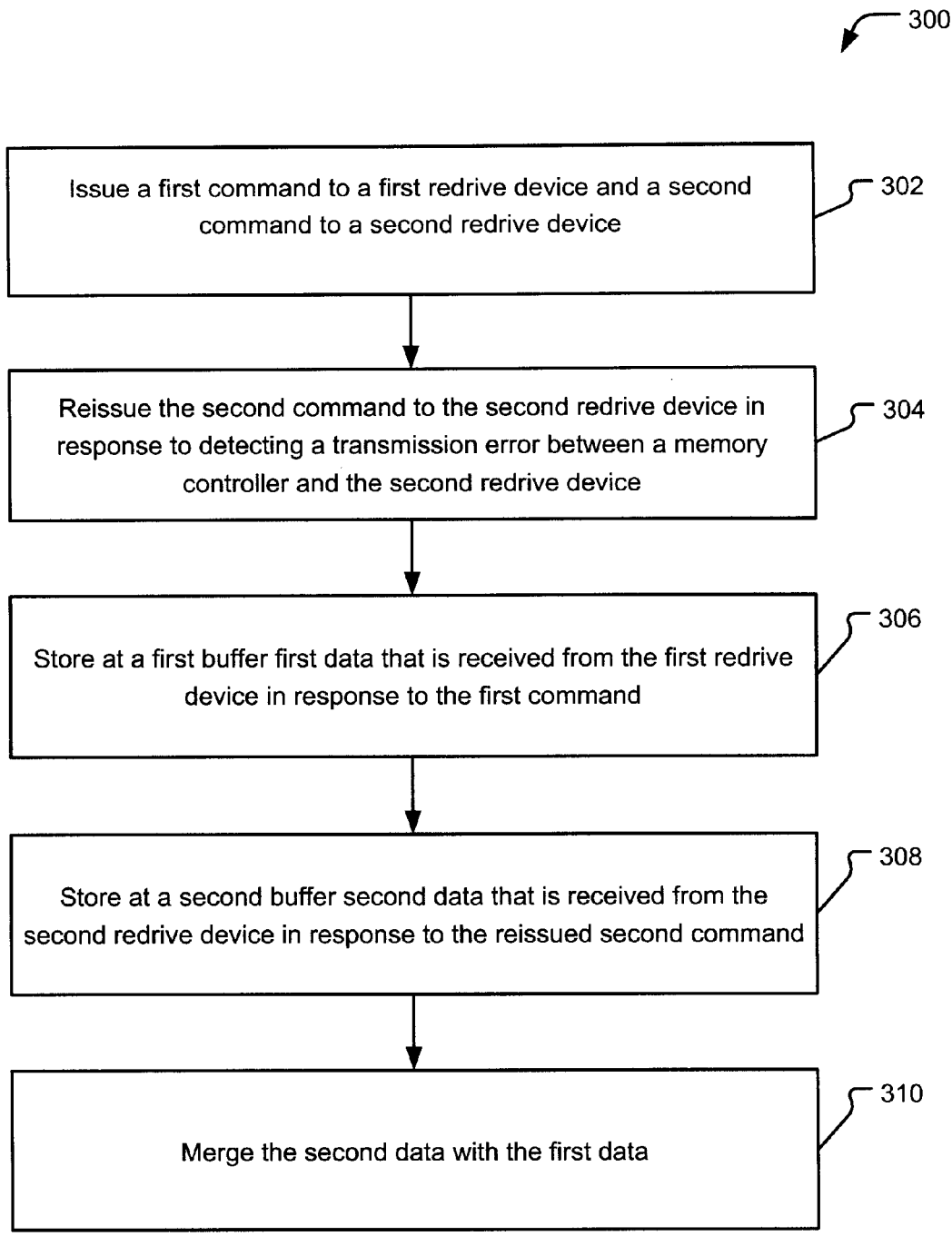
FIG. 3 is a flow diagram of a first embodiment of a method to respond to error detection.

FIG. 3 is a flow diagram of a first embodiment of a method to respond to error detection and is generally designated 300. In a particular embodiment, the method 300 is performed by any of the system of FIGS. 1 and 2, or any combination thereof. The method 300 may include issuing a first command to a first redrive device and a second command to a second redrive device, at block 302. For example, the memory controller 102 of FIGS. 1 and 2 may issue the first command 112 to the first redrive device 104 and the second command 114 to the second redrive device 106. The method 300 may also include reissuing the second command to the second redrive device in response to detecting a transmission error between a memory controller and the second redrive device, at block 304. For instance, the memory controller 102 of FIGS. 1 and 2 may reissue the second command 120 to the second redrive device 106 in response to detecting the transmission error between the memory controller 102 and the second redrive device 106.

The method 300 may further include storing at a first buffer first data that is received from the first redrive device in response to the first command, at block 306. For example, the memory controller 102 of FIGS. 1 and 2 may store at the first buffer 108 the first data 116 that is received from the first redrive device 104 in response to the first command 112. The method 300 may include storing at a second buffer second data that is received from the second redrive device in response to the reissued second command, at block 308. For instance, the memory controller 102 may store at the second buffer 110 the second data 122 that is received from the second redrive device 106 in response to the reissued second command 120. The method 300 also includes merging the second data with the first data, at block 310. For example, the memory controller 102 of FIGS. 1 and 2 may merge the second data 122 with the first data 116.

Figure 4:
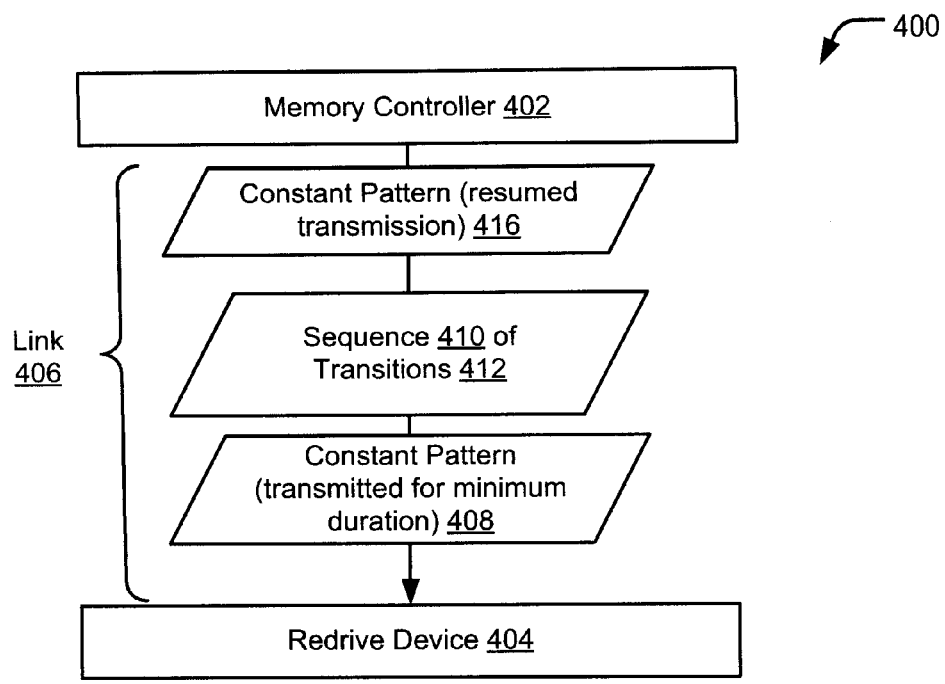
FIG. 4 is a block diagram of a third embodiment of a system to respond to error detection.
Figure 4:
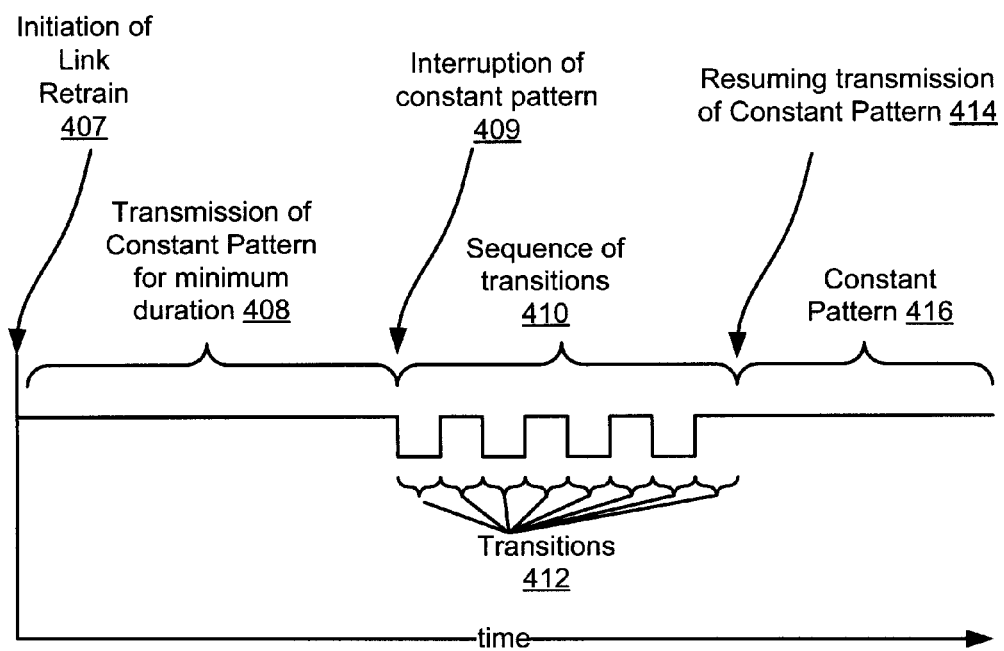

FIG. 4 is a diagram of another embodiment of a system to respond to error detection and is generally designated 400. The system 400 includes a memory controller 402 and a redrive device 404. The memory controller 402 and the redrive device 404 may be connected via a link 406. The link 406 may include two unidirectional high speed links. For instance, the memory controller 402 may transmit to the redrive device 404 via a southbound link of the link 406 and the redrive device 404 may transmit to the memory controller 402 via a northbound link of the link 406.

Generally, the memory controller 402 may transmit a signal pattern to a redrive device 404 to indicate that the memory controller 402 is initiating 407 a retrain of the link. To distinguish the transmission of the signal pattern indicating a link retrain action from a regular data transmission, the signal pattern may be a constant pattern without transitions. For example, the memory controller 402 may transmit for multiple cycles a signal equivalent to a digital constant of one. The signal would not include a transition to an equivalent of a digital constant of zero.

The memory controller 402 and the redrive device 404 may rely on transitions in the signal pattern to maintain alignment. Without receiving a transition during transmission of the constant pattern, the memory controller 402 and the redrive device 404 may be unable to maintain alignment. For instance, transmission of the constant pattern 408 may result in the memory controller 402 and the redrive device 404 losing alignment or becoming further misaligned. Further misalignment may result in an alignment locking algorithm performing more processes in a later stage to regain alignment.

Interrupting the transmission of the constant pattern 409 to transmit a sequence 410 of transitions 412 before resuming 414 the transmission of the constant pattern 416 may allow the memory controller 402 and the redrive device 404 to maintain alignment during the link retrain action. Alignment may be maintained when the number of transitions 412 transmitted satisfies a minimum acceptable transition density. Maintaining alignment during the link retrain action may allow the memory controller 402 and redrive device 404 to use a less efficient alignment locking algorithm at a later stage of the link retrain action. For example, an alignment locking algorithm may be selected that may perform relatively slowly, but that has reduced power, space and manufacturing requirements. The alignment locking algorithm may perform fewer processes to reconfirm alignment or resume alignment because the alignment was not lost. Reducing the number of processes that the alignment locking algorithm performs may reduce the overall latency of the link retrain action. Reducing the latency of the link retrain action may improve the overall efficiency of the memory controller 402 and reducing the size will cause it to cost less.

The memory controller 402 may be configured to transmit the constant pattern in response to initiation 407 of the retrain of the link between the memory controller 402 and the redrive device 404. The memory controller 402 may be configured to interrupt 409 the transmission of the constant pattern 408 after the constant pattern has been transmitted for the minimum duration to transmit a sequence 410 of transitions 412. The memory controller 402 may be configured to resume 414 the transmission of the constant pattern 416 after transmitting the sequence 410 of transitions 412.

The memory controller 402 may issue a command stream to the redrive device 404. For instance, the redrive device 404 may receive the command stream from the memory controller 402 via the southbound link of the link 406. The redrive device 404 may decode and reformat the command stream to send to a memory structure (not illustrated) connected to the redrive device 404. The memory structure may retrieve data in response to the command stream and may transmit the data to the redrive device 404. The redrive device 404 may reformat the data and transmit the reformatted data to the memory controller 402. For example, the redrive device 404 may transmit the data to the memory controller 402 via the northbound link of the link 406 after reformatting the data.

Communication on both the southbound link and the northbound link may be checked for errors. Error detection on the command stream received via the southbound link may be performed by the redrive device 404. For instance, the redrive device 404 may include logic that performs CRC checking. The CRC checking may determine that a particular command in the command stream contains a single bit error (i.e., a transmission error). After detecting the transmission error, the redrive device 404 may drop all subsequent commands in the command stream and return an alert status frame to the memory controller 402.

In a particular embodiment, the redrive device 404 returns a stream of alert status frames to the memory controller 402 via the northbound link in response to the transmission error. The memory controller 402 may use the received alert status frames to detect the transmission error between the memory controller 402 and the redrive device 404. For example, the memory controller 402 may determine that the transmission error occurred in the southbound link of the link 406 based on the receipt of the alert status frame via the northbound link.

In response to detecting the transmission error, the memory controller 402 may perform a corrective action. For instance, after receiving the alert status frame, the memory controller 402 may issue a link reset of the link 406. The link reset may clear the link 406 of the alert status frames. The link 406 may be ready for reissuance of the command stream. For example, the memory controller 402 may reissue the command stream to the redrive device 404 via the southbound link of the link 406.

The link reset may be unsuccessful in clearing the link 406 of the alert status frames. The link 406 may not be ready to receive the reissued commands. For instance, the memory controller 402 may continue to receive alert status frames on the northbound link after performing the link reset. The memory controller 402 may initiate 407 a link retrain action. The link retrain action may include retraining the link 406 between the memory controller 402 and the redrive device 404.

Retraining the link 406 may include the memory controller 402 notifying the redrive device 404 that the link is being retrained. Notifying the redrive device 404 that the memory controller 402 is initiating 407 the link retrain action may include transmitting the constant pattern 408 to the redrive device 404. In a particular embodiment, the constant pattern is a 'disable b' signal that disables normal operations at the redrive device. For example, during transmission of the constant pattern 408, the memory controller 402 may transmit a sequence of digital constants without transitions. The memory controller 402 may transmit all ones without a transition to zero. In response to receiving the signal pattern without a transition, the redrive device 404 may determine that the memory controller 402 is initiating 407 the link retrain action.

The constant pattern may be transmitted for a minimum duration to ensure that the redrive device 404 registers the transmission as an indication that the memory controller 402 is initiating 407 the link retrain action. The minimum duration may be based on a minimum number of unit intervals for the redrive device 404 to recognize the constant pattern. The unit interval may be the time for the memory controller 402 to transmit one transition on the link at line speed. For instance, the memory controller 402 may transmit the constant pattern for one hundred and forty-four unit intervals without a transition to indicate to the redrive device 404 that the memory controller 402 has initiated 407 the link retrain action.

The memory controller 402 may interrupt 409 the transmission of the constant pattern 408 after the constant pattern has been transmitted for the minimum duration by transmitting a sequence 410 of transitions 412. Transmitting the sequence 410 of transitions 412 maintains alignment between the memory controller 402 and the redrive device 404. The number of transitions 412 in the sequence 410 of transitions 412 may be based on a minimum bit transition density of the link 406. The minimum bit transition density may indicate a minimum number of transitions 412 to maintain bit alignment between the memory controller 402 and the redrive device 404. For example, the minimum number of transitions 412 necessary to maintain bit alignment may be eight transitions 412. The memory controller 402 may transmit an alternating signal pattern equivalent to digital constants of ones and zeros before resuming the constant pattern of all ones.

After transmitting the sequence 410 of transitions 412, the memory controller 402 may resume 414 transmission of the constant pattern 416. Interrupting 409 the constant pattern 408 to issue the sequence 410 of transitions 412 may allow the memory controller 402 and the redrive device 404 to remain aligned. Maintaining alignment during the link retrain action may allow the memory controller 402 and redrive device 404 to use a less efficient alignment locking algorithm at a later stage of the link retrain action. For instance, an alignment locking algorithm may be selected that performs slow but uses less power and occupies less space. Although the alignment locking algorithm may perform relatively slowly, the alignment locking algorithm may perform fewer processes to regain alignment. Reducing the number of processes that the alignment locking algorithm performs may reduce the overall latency of the link retrain action. Reducing the latency of the link retrain action may improve the overall efficiency of the memory controller 402.

Figure 5:
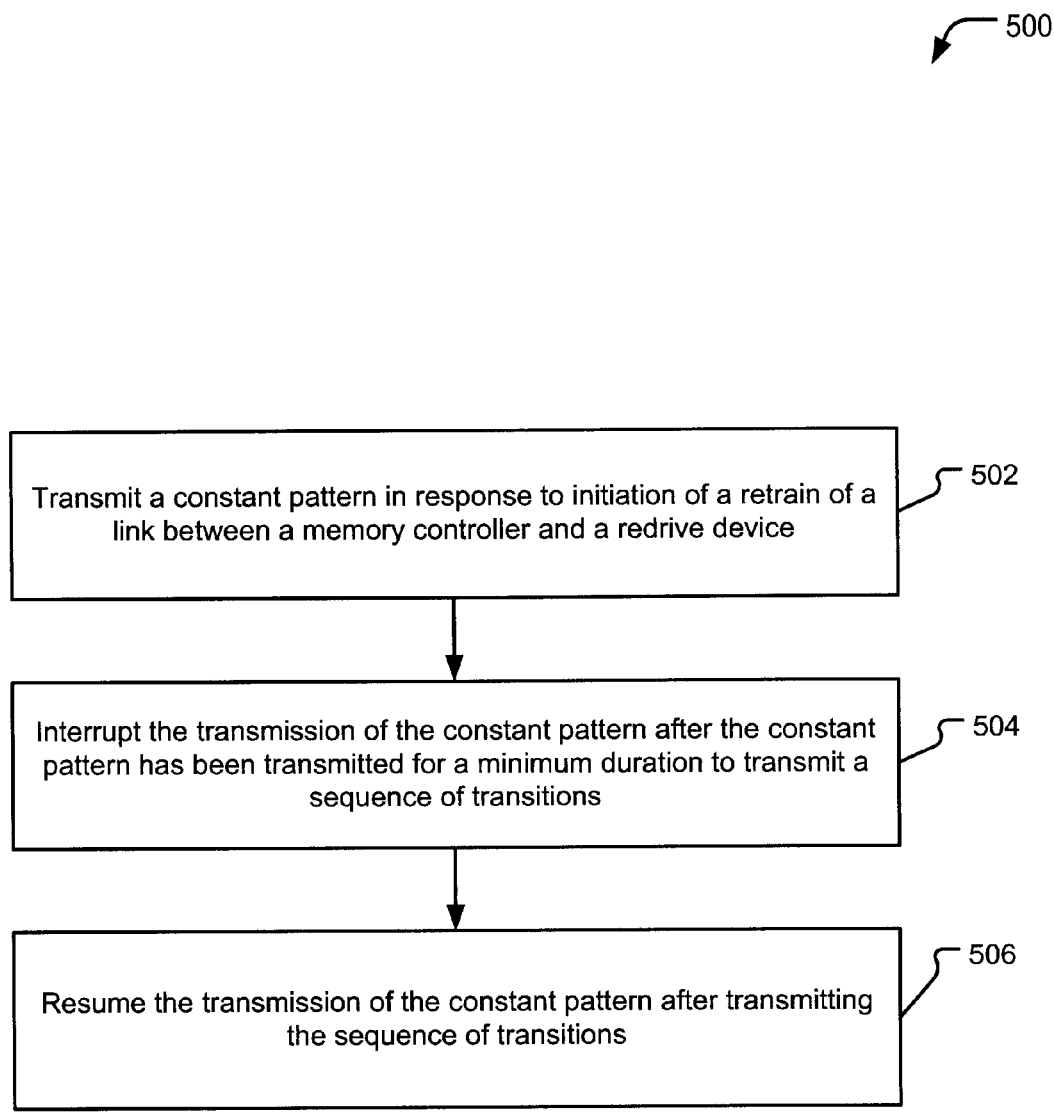
FIG. 5 is a flow diagram of second embodiment of a method to respond to error detection.

FIG. 5 is a flow diagram of a second embodiment of a method to respond to error detection and is generally designated 500. In a particular embodiment, the method 500 is performed by the system of FIG. 4. The method 500 includes transmitting a constant pattern in response to initiation of a retrain of a link between a memory controller and a redrive device, at block 502. For example, the memory controller 402 of FIG. 4 transmits the constant pattern 408 in response to initiation 407 of the retrain of the link 406 between the memory controller 402 and the redrive device 404. The method 500 also includes interrupting the transmission of the constant pattern after the constant pattern has been transmitted for a minimum duration to transmit a sequence of transitions, at block 504. For instance, the memory controller 402 of FIG. 4 may interrupt 409 the transmission of the constant pattern 408 after the constant pattern has been transmitted for a minimum duration to transmit a sequence 410 of transitions 412. The method 500 further includes resuming the transmission of the constant pattern after transmitting the sequence of transitions, at block 506. For example, the memory controller 402 of FIG. 4 may resume 414 the transmission of the constant pattern 416 after transmitting the sequence 410 of transitions 412.

Figure 6:
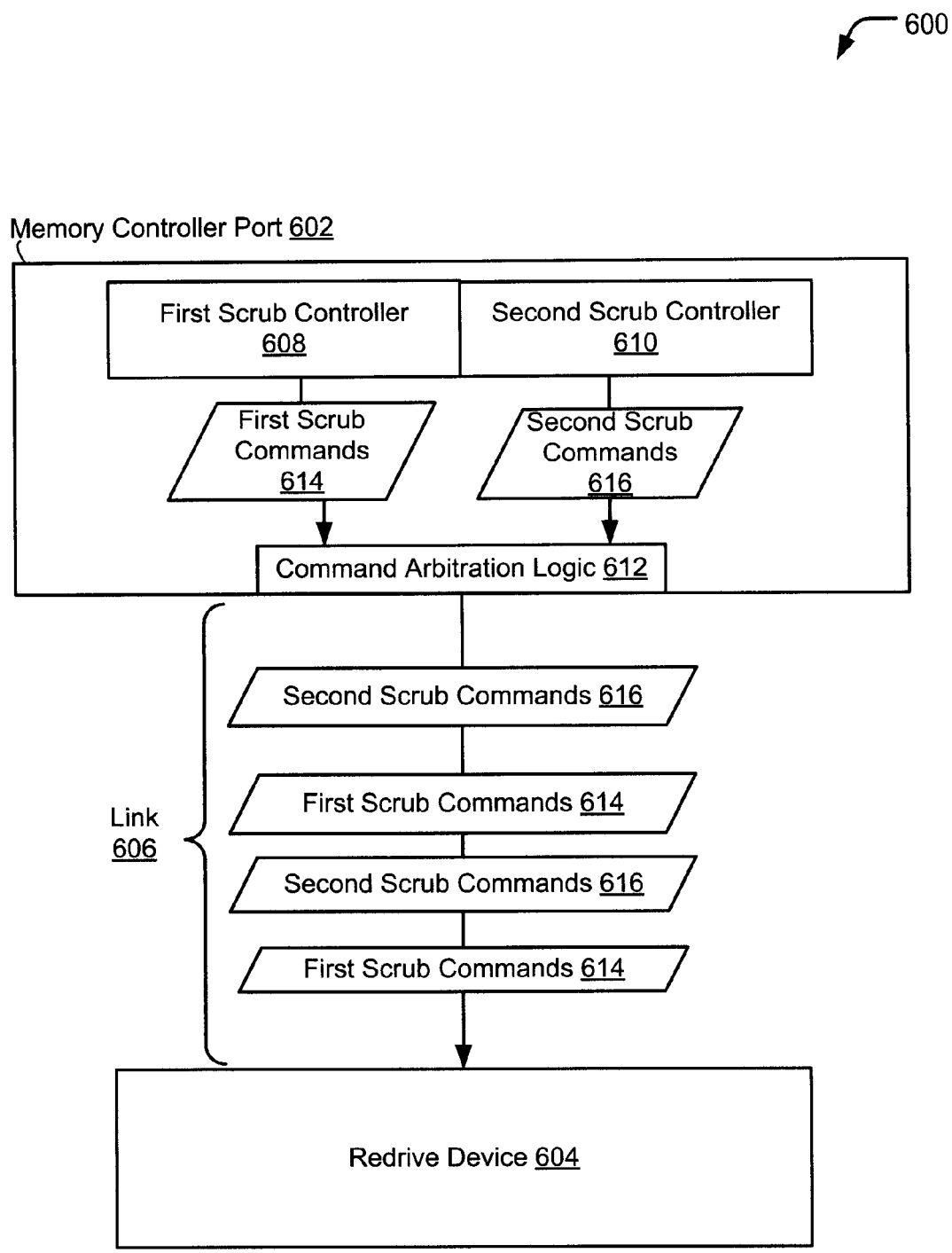
FIG. 6 is a block diagram of a fourth embodiment of a method to respond to error detection.

FIG. 6 is a diagram of a fifth embodiment of a system to respond to error detection and is generally designated 600. The system 600 includes a redrive device 604, a memory controller port 602 with command arbitration logic 612, a first scrub controller 608 and a second scrub controller 610. The memory controller port 602 and the redrive device 604 are connected via a link 606. The link 606 may include two uni-directional links. For instance, the memory controller 602 may transmit to the redrive device 604 via a southbound link of the link 606 and the redrive device 604 may transmit to the memory controller 602 via a northbound link of the link 606.

Generally, each scrub controller may create scrub commands to scrub a particular memory structure. For example, the first scrub controller 608 may create first scrub commands 614 directed to a first memory structure (not illustrated) and the second scrub controller 610 may create second scrub commands 616 directed to a second memory structure (not illustrated). The memory controller may alternate issuance of the scrub commands from each scrub controller. Alternating between each scrub controller may allow the memory controller port 602 to scrub multiple memory structures via a single link 606.

The memory controller port 602 may be configured to create the first scrub commands 614 at the first scrub controller 608. The memory controller port 602 may be configured to create the second scrub commands 616 at the second scrub controller 610. The memory controller port 602 may be configured to alternate issuance of the first scrub commands 614 and the second scrub commands 616 at the memory controller port 602.

The memory controller port 602 may use the scrub commands to detect and correct errors in data. For instance, the first scrub controller 608 may create a scrub read command (e.g., the first scrub command) that is issued from the memory controller port 602. In response to issuance of the scrub read command, the memory controller port 602 may receive scrub read data. The memory controller port 602 may include logic that checks the scrub read data for error correction codes (ECC). For example, ECC checking may indicate that the scrub read data contains a single bit error. The memory controller port 602 may invoke redundant bit steering (RBS) to correct the error. After the error is corrected, the first scrub controller 608 may create a scrub write command that is issued from the memory controller port 602. The scrub write command may write the corrected scrub read data in a memory address from which the scrub read data was previously retrieved.

The memory controller port 602 may alternate issuance of the first scrub commands 614 and the second scrub commands 616. The command arbitration logic 612 alternates issuance of the first scrub commands 614 and the second scrub commands 616. Alternating issuance of the scrub commands may include issuing the scrub commands in the following order: a first scrub command, a second scrub command, a first scrub command, and a second scrub command. Alternating between each scrub command may allow the memory controller port 602 to scrub multiple memory structures via a single link (e.g., the link 606). For instance, the first scrub commands 614 may be directed to the first memory structure and the second scrub commands 616 may be directed to the second memory structure. The addresses in the first memory structure and the second memory structure may be scrubbed at the same time by the same memory controller port 602.

Figure 7:
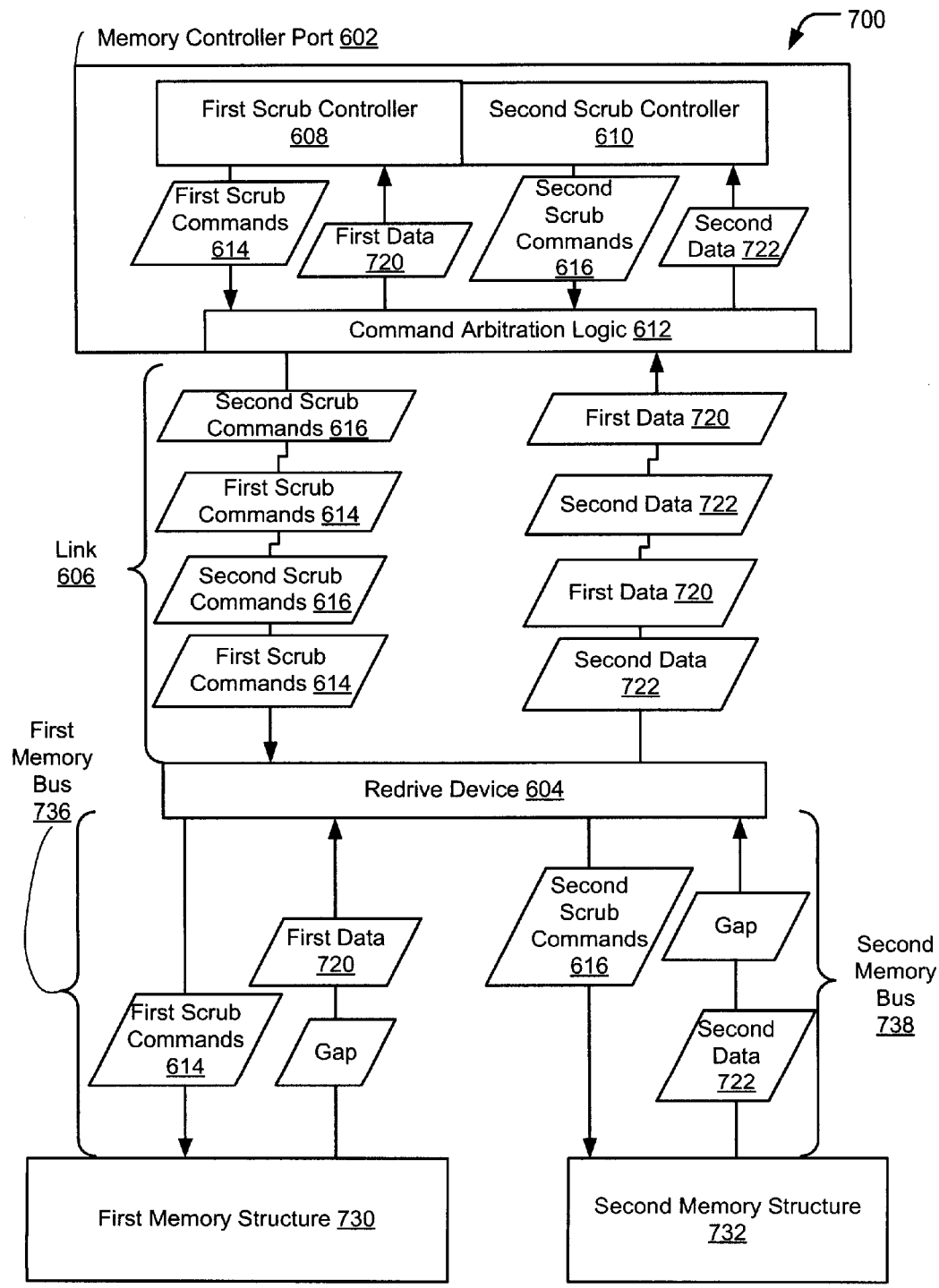
FIG. 7 is a block diagram of a fifth embodiment of a system to respond to error detection.

Referring to FIG. 7, a diagram of another embodiment of a system to respond to error detection is illustrated and is generally designated 700. The system 700 includes a redrive device 604, a first memory structure 730, and a second memory structure 732. The system also includes a memory controller port 602 with command arbitration logic 612, a first scrub controller 608 and a second scrub controller 610. The memory controller port 602 and the redrive device 604 may be connected via a link 606. The link 606 may include two unidirectional links. For example, the memory controller may transmit to the redrive device 604 via a southbound link of the link 606 and the redrive device 604 may transmit to the memory controller via a northbound link of the link 606. The redrive device 604 may be connected to the first memory structure 730 via a first memory bus 736 and connected to the second memory structure 732 via a second memory bus 738.

Generally, each scrub controller may create scrub commands to scrub a particular memory structure. For instance, the first scrub controller 608 may create first scrub commands 614 directed to the first memory structure 730. The second scrub controller 610 may create second scrub commands 616 directed to the second memory structure 732. The memory controller may alternate issuance of the scrub commands from each scrub controller to the redrive device 604 via the link 606. The redrive device 604 may issue the first scrub commands 614 to the first memory structure 730 and the second scrub commands 616 to the second memory structure 732. Alternating between each scrub controller may allow the memory controller port 602 to scrub multiple memory structures via a single link (e.g., the link 606).

The memory controller port 602 may use the scrub commands to detect and correct errors in data. For example, the first scrub controller 608 may create a first scrub read command (e.g., the first scrub command) that is issued from the memory controller port 602 to the redrive device 604. The redrive device 604 may format and decode the scrub read command to transmit to the first memory structure 730. For instance, the redrive device 604 may change the scrub read command to a DDR address that is recognized by the first memory structure 730. The redrive device 604 may transmit the formatted scrub read command to the first memory structure 730 via the first memory bus 736.

In response to receiving the formatted scrub read command (e.g., the first scrub command), the first memory structure 730 may retrieve scrub read data (e.g., first data 720) and transmit the scrub read data to the redrive device 604 via the first memory bus 736. The first memory structure 730 may retrieve the scrub read data in a burst chop four mode (BC4) mode. Operating in BC4 mode, the first memory structure 730 may retrieve four beats of data followed by four beats of gap. For example, the first memory structure 730 may transmit four beats of the scrub read data (e.g., the first data 720) to the redrive device 604 followed by four beats of gap. The redrive device 604 may receive a first data stream that includes an alternating pattern of gaps and portions of the first data 720.

The redrive device 604 may receive second scrub commands 616 from the memory controller via the link 606. In a particular embodiment, the command arbitration logic 612 alternates issuance of the first scrub commands 614 and the second scrub commands 616. The redrive device 604 may transmit the second commands to the second memory structure 732 over the second memory bus 738. In response to the second scrub commands 616, the second memory structure 732 may retrieve second data 722 and transmit the second data 722 to the redrive device 604 via the second memory bus 738. Operating in BC4 mode, the second memory structure 732 may transmit four beats of the second data 722 to the redrive device 604 followed by four beats of gap. The redrive device 604 may receive a second data stream that includes an alternating pattern of gaps and portions of the second data 722.

The redrive device 604 may format and decode the first data 720 in the first data stream and the second data 722 in the second data stream. For instance, the redrive device 604 may change the first data 720 and the second data 722 into data that corresponds to addresses in the memory controller port 602. After formatting the first data 720 and the second data 722, the redrive device 604 may transmit the first data 720 and the second data 722 to the memory controller port 602 via the link 606.

The redrive device 604 may alternate transmitting the first data 720 from the first data stream and transmitting the second data 722 from the second data stream. The redrive device 604 may transmit the first data stream and the second data stream without the gaps. The memory controller port 602 may receive an alternating pattern of the first data 720 and the second data 722 without gaps. The memory controller port 602 may direct the first data 720 to the first scrub controller 608 and the second data 722 to the second scrub controller 610. Receiving data via the link 606 without the gaps may improve utilization of the link 606.

The memory controller port 602 may include logic that checks data received via the link 606 for errors. For example, ECC checking may indicate that the scrub read data (e.g., the first data 720) contains a single bit error. The memory controller port 602 may invoke RBS to correct the error. After the error is corrected, the first scrub controller 608 may issue a scrub write command (e.g., the first command) to the redrive device 604. The redrive device 604 may format the scrub write command and transmit the scrub write command to the first memory structure 730. The scrub write command may instruct the first memory structure 730 to overwrite data in the first memory structure 730 with the scrub read data corrected by RBS.

One of the second scrub commands 616 issued by the memory controller port 602 may be the scrub write command. The redrive device 604 may issue an alternating pattern of scrub write commands to both the first memory structure 730 and the second memory structure 732. Alternating issuance of the first scrub commands 614 and the second scrub commands 616 may allow the memory controller port 602 to scrub both the first memory structure 730 and the second memory structure 732 via the single link 606. Performing memory scrubbing on multiple memory structures improves the efficiency of the memory controller port 602 and reduces memory latency.

Figure 8:
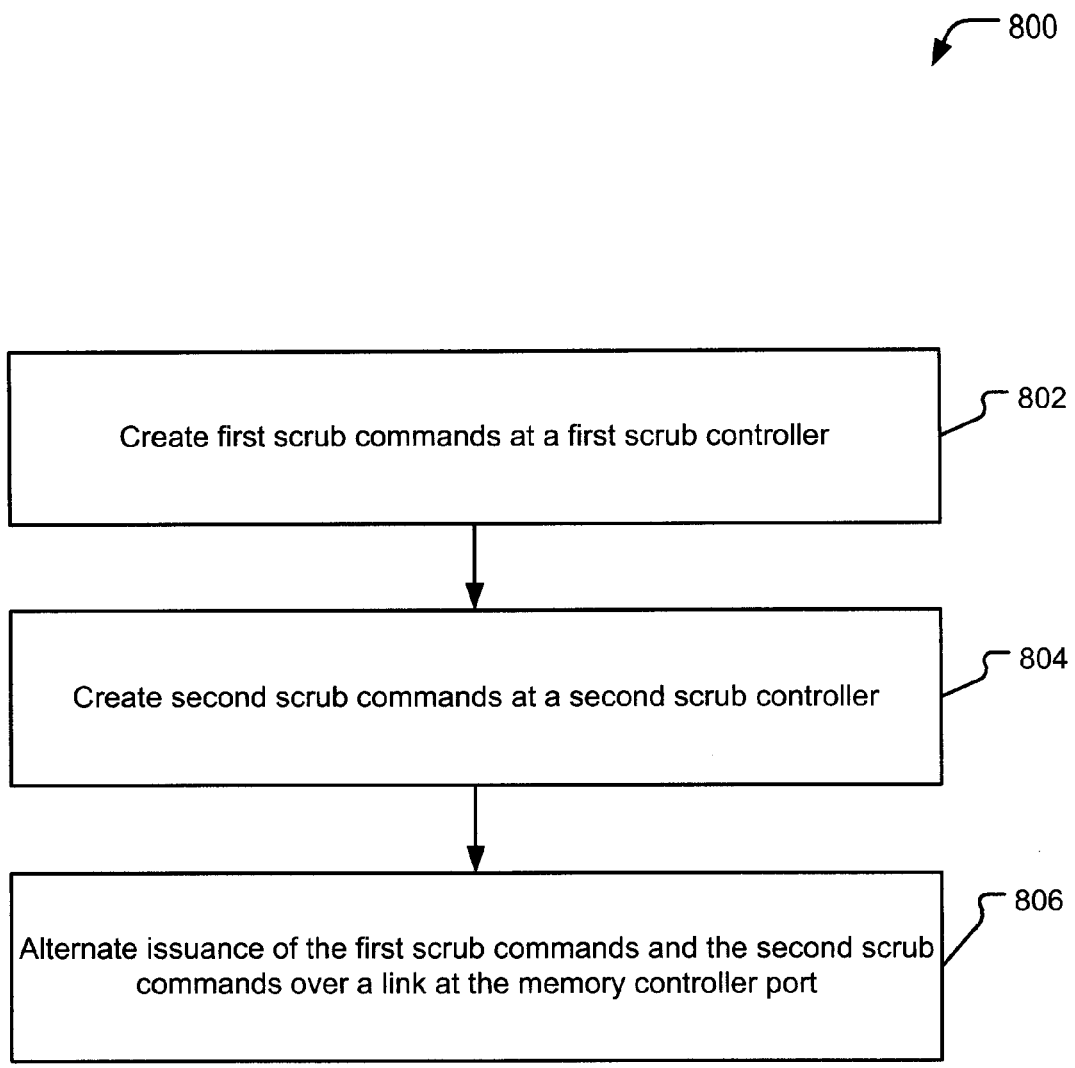
FIG. 8 is a flow diagram of a third embodiment of a method to respond to error detection.

FIG. 8 is a flow diagram of a third embodiment of a method to respond to error detection and is generally designated 800. The method 800 is performed by any of the systems of FIGS. 6 and 7, or any combination thereof. The method 800 includes creating first scrub commands at a first scrub controller, at block 802. For instance, the first scrub controller 608 of FIGS. 6 and 7 may create the first scrub commands 614. The method 800 also includes creating second scrub commands at a second scrub controller, at block 804. For example, the second scrub controller 610 of FIGS. 6 and 7 may create the second scrub commands 616. The method 800 further includes alternating issuance of the first scrub commands and the second scrub commands at a memory controller port, at block 806. For instance, the memory controller port 602 of FIGS. 6 and 7 may alternate issuance of the first scrub commands 614 and the second scrub commands 616.

Particular embodiments can take the form of an entirely hardware embodiment, an entirely software embodiment or an embodiment containing both hardware and software elements. The disclosed methods are implemented in software, which includes but is not limited to firmware, resident software, microcode, etc.

Further, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CD-ROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, method, and illustrative examples shown and described. Accordingly, departures may be made from such details without departing from the spirit or scope of Applicants' general inventive concept.

The invention claimed is:

1. A method of responding to error detection, the method comprising:
    splitting a single command into at least a first command and a second command;
    issuing the first command to a first redrive device and the second command to a second redrive device;
    reissuing the second command to the second redrive device in response to detecting a transmission error between a memory controller and the second redrive device;
    storing at a first buffer first data that is received from the first redrive device in response to the first command;
    storing at a second buffer second data that is received from the second redrive device in response to the reissued second command; and
    merging the second data with the first data as at least part of completing the single command.

2. The method of claim 1, further comprising:
    issuing a third command to the first redrive device after issuance of the first command; and
    storing at the first buffer third data that is received from the first redrive device in response to the third command.

3. The method of claim 2, further comprising:
    issuing a fourth command to the second redrive device after issuance of the second command;
    reissuing the fourth command to the second redrive device in response to detecting the transmission error between the memory controller and the second redrive device; and
    storing at the second buffer fourth data that is received from the second redrive device in response to the reissued fourth command.

4. The method of claim 3, further comprising merging the fourth data with the third data as at least part of completing one or more single commands.

5. The method of claim 1, wherein detecting the transmission error includes receiving an alert status frame from the second redrive device in response to the second command.

6. The method of claim 5, further comprising halting issuance of subsequent commands to both the first redrive device and the second redrive device in response to receiving the alert status frame.

7. The method of claim 1, further comprising issuing a soft reset to clear a link between the memory controller and the second redrive device of alert status frames.

8. A method of responding to error detection in a memory controller comprising:
issuing a first command directed to a redrive device at a first port, the first port coupled to a first link;
issuing a second command directed to a redrive device at a second port, the second port coupled to a second link distinct from the first link;
reissuing the second command at the second port in response to detecting a transmission error received at the second port;
storing at a first buffer first data that is received through the first port originating from the redrive device, in response to the first command;
receiving second data at the second port originating from the redrive device in response to the reissued second command; and
merging the second data with the first data to at least partially complete a single command that had been split into at least the first and second commands.

9. The method of claim 8, further comprising:
issuing a third command directed to a redrive device at the first port, after issuance of the first command; and
buffering third data that is received through the first port in response to the third command.

10. The method of claim 9, further comprising:
issuing a fourth command directed to a redrive device at the second port after issuance of the second command;
reissuing the fourth command at the second port in response to detecting receipt of a transmission error indicator at the second port between the memory controller and the second redrive device; and
buffering fourth data that is received at the second port in response to the reissued fourth command.

11. The method of claim 10, further comprising merging the fourth data with the third data.

12. The method of claim 8, wherein detecting the transmission error includes receiving an alert status frame at the second port originating from the redrive device in response to the second command.

13. The method of claim 12, further comprising halting issuance of subsequent commands at both the first port and the second port in response to receiving the alert status frame.

14. The method of claim 8, further comprising issuing a soft reset through the second port to clear the link in operable connection to the second port.

15. A memory system comprising:
a memory controller;
at least two ports in the memory controller that are operably connectable to at least two links;
buffers controllable by the memory controller and configurable to hold a plurality of responses from issued subcommands;
the memory controller further configured to:
split at least one command into a set of subcommands;
issue the set of subcommands using at least two of the at least two ports;
buffer results received by the memory controller associated with each issued subcommand, as needed, until results from each subcommand of the set of subcommands have been received;
for an error condition received at any port, reissue a subcommand originally issued to that port for which no response has been received at the memory controller, and merge data received or buffered for a set of subcommands to complete the split command.

16. The memory system of claim 15 where the memory controller is further configured to:
split a single command into a first and second subcommand;
issue each subcommand at a different port, intended for reception by different redrivers;
buffer received responses associated with the subcommands;
if a transmission error is received at a port, reissue the subcommand originally sent through that port, do not reissue the other of the two subcommands, and, upon receipt of data associated with the reissued subcommand merge the buffered data with the data associated with the reissued subcommand to complete the single command.

17. The memory system of claim 16 where the memory controller is further configured to:
split a next command into two next subcommands, issue one of the next subcommands at the same port that the first subcommand was issued, and, buffer data received as a result of issuing the this next subcommand.

18. The memory system of claim 17 where the memory controller is further configured to:
issue the other next subcommand at the same port as the second subcommand was issued, and upon detecting the error condition, reissue the other next subcommand, and, merge data from both next subcommands using data received as a result of having reissuing the other next subcommand.

19. The memory system of claim 15 where the memory controller is further configured to detect errors by reception at a port of an alert status frame, the alert status frame originating from a redrive device.

20. The memory system of claim 19 where the memory controller is further configured to halt issuance of subsequent subcommands in response to receiving the alert status frame.

21. The memory system of claim 19 where the memory controller is further configured to issue a soft reset through the port, the soft reset configured to be received by the redrive device to clear any existing alert status frames.

* * * * *